US010948376B2

(12) United States Patent
Yoon et al.

(10) Patent No.: US 10,948,376 B2
(45) Date of Patent: Mar. 16, 2021

(54) APPARATUS AND METHOD OF DETECTING LEAK SOUND IN PLANT EQUIPMENT USING TIME-FREQUENCY TRANSFORMATION

(71) Applicant: KOREA ATOMIC ENERGY RESEARCH INSTITUTE, Daejeon (KR)

(72) Inventors: Doo Byung Yoon, Daejeon (KR); Soon Sung Moon, Daejeon (KR); Bong Su Yang, Jeju-do (KR); Jin Ho Park, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 336 days.

(21) Appl. No.: 16/001,362

(22) Filed: Jun. 6, 2018

(65) Prior Publication Data
US 2019/0078960 A1    Mar. 14, 2019

(30) Foreign Application Priority Data
Sep. 14, 2017  (KR) ........................ 10-2017-0117912

(51) Int. Cl.
*G01M 3/24* (2006.01)
*H04R 1/40* (2006.01)
(Continued)

(52) U.S. Cl.
CPC .............. *G01M 3/24* (2013.01); *H04R 1/406* (2013.01); *H04R 3/005* (2013.01); *H04R 29/00* (2013.01)

(58) Field of Classification Search
CPC ......... G01M 3/24; H04R 1/406; H04R 3/005; H04R 29/00
See application file for complete search history.

(56) References Cited

U.S. PATENT DOCUMENTS

| 5,544,074 A | 8/1996 | Suzuki et al. |
| 10,386,261 B2* | 8/2019 | Al-Sayed Wahba ...... F17D 5/06 |

(Continued)

FOREIGN PATENT DOCUMENTS

| KR | 1993-0016769 | 8/1993 |
| KR | 1999-0001295 | 1/1999 |

(Continued)

OTHER PUBLICATIONS

Korean Office Action dated Aug. 20, 2018 in corresponding Korean Application No. KR 10-2017-0117912.

(Continued)

*Primary Examiner* — Bryan Bui
(74) *Attorney, Agent, or Firm* — Mintz Levin Cohn Ferris Glovsky and Popeo, P.C.; Peter F. Corless

(57) ABSTRACT

An apparatus for detecting a leak sound in plant equipment using time-frequency transformation includes a first microphone measuring an acoustic signal generated in the plant equipment, a second microphone measuring an acoustic signal generated in the plant equipment, and a leak sound detection module detecting a leak sound in the plant equipment using time-frequency transformation of the acoustic signal measured by the first microphone and the acoustic signal measured by the second microphone, wherein a leak sound may be detected even when a transient dispersive noise signal, as well as a periodic noise signal, is large.

7 Claims, 9 Drawing Sheets
(7 of 9 Drawing Sheet(s) Filed in Color)

(51) Int. Cl.
  *H04R 29/00* (2006.01)
  *H04R 3/00* (2006.01)

(56) References Cited

U.S. PATENT DOCUMENTS

2007/0068225 A1* 3/2007 Brown ................ G01M 3/2876
                                                    73/40.5 A
2015/0177403 A1* 6/2015 Haugen ................ E21B 47/001
                                                    73/152.47

FOREIGN PATENT DOCUMENTS

KR    2013-0098971 A    9/2013
KR    2014-0067340 A    6/2014

OTHER PUBLICATIONS

Y.S. Yoon et al., "Detection of Abnormal Leakage and Its Location by Filtering of Sonic Signals at Petrochemical Plant", The Korean Society of Mechanical Engineers, 36(6), pp. 655-662 (2012)—English language Abstract.
W. Rhee et al., "Elimination of Self Noise & Doppler Effects from the Microphone Array Measurement", The Korean Society for Noise and Vibration Engineering, 16(7), pp. 677-682, Jul. 31, 2006—English language Abstract.

* cited by examiner

APPARATUS AND METHOD OF DETECTING LEAK SOUND IN PLANT EQUIPMENT USING TIME-FREQUENCY TRANSFORMATION

CROSS-REFERENCE TO RELATED APPLICATION

This application claims benefit of priority to Korean Patent Application No. 10-2017-0117912 filed on Sep. 14, 2017 in the Korean Intellectual Property Office, the disclosure of which is incorporated herein by reference in its entirety.

BACKGROUND

1. Field

The present disclosure relates to an apparatus and method of detecting a leak sound (or leak noise) of plant equipment using time-frequency transformation.

2. Description of Related Art

As a method of monitoring leakage that may occur in aged plant equipment, a method of monitoring the occurrence of a leak sound using a microphone may be considered. The use of an acoustic signal (or a sound signal) is advantageous, in that leakage monitoring may be performed at a distance, but disadvantageous, in that the acoustic signal may be affected by ambient noise other than a leak sound. In particular, most plants including a power plant have ambient noise due to machine operations, or the like, and detection of a leak sound in such a noisy environment requires a signal processing technique capable of eliminating or reducing the influence of ambient noise.

Conventionally, a method of removing specific frequency components corresponding to machinery noise from a measured acoustic signal using a filtering technique such as a notch filter, or the like, has been used. In this case, however, the frequency component (frequency band) which is to be removed must be determined in advance and, in order to determine such a frequency band, a machine noise component must be searched by analyzing a previously recorded acoustic signal.

In addition, in the case of plant equipment, various rotating machines are operated at different rotation speeds. Therefore, in order to utilize the conventional notch filtering method, machinery noise must be analyzed for each acoustic signal measurement zone and different notch filter conditions must be set for each measurement zone. Therefore, it is necessary to devise a method of removing periodical machine noise components from a measured acoustic signal without any prior knowledge of machinery noise.

For example, Korean Laid-Open Patent Publication No. 1993-0016769 ("Method and Apparatus for Detecting Abnormal Location of a Buried Pipe," published on Aug. 30, 1993) discloses a technique related to leak sound detection.

RELATED ART DOCUMENT

Patent Document (Patent document 1) Korean Laid-Open Patent Publication No. 1993-0016769 ("Method and Apparatus for Detecting Abnormal Location of a Buried Pipe," published on Aug. 30, 1993)

SUMMARY

An aspect of the present disclosure may provide an apparatus and method of detecting a leak sound in plant equipment using time-frequency transformation, capable of detecting a leak sound even when a machinery noise based on a rotating machinery is large.

According to an aspect of the present disclosure, an apparatus for detecting a leak sound in plant equipment using time-frequency transformation may include: a first microphone measuring an acoustic signal generated in the plant equipment; a second microphone measuring an acoustic signal generated in the plant equipment; and a leak sound detection module detecting a leak sound in the plant equipment from the acoustic signal measured by the first microphone and the acoustic signal measured by the second microphone, wherein the leak sound detection module detects the leak sound using time-frequency transformation of the acoustic signal measured by the first microphone and the acoustic signal measured by the second microphone.

According to another aspect of the present disclosure, a method of detecting a leak sound using a leak sound detecting apparatus having a first microphone and a second microphone measuring an acoustic signal generated in plant equipment, may include: a first operation in which a time-frequency transformation unit performs time-frequency transformation on a first acoustic signal measured at a first point in time through the first microphone, a second acoustic signal measured at the first point in time through the second microphone, and a third acoustic signal measured at a second point in time after the lapse of a predetermined amount of time from the first point in time through the second microphone; a second operation in which a time-frequency spectrum calculation unit calculates a first cross time-frequency spectrum of the time-frequency-transformed first acoustic signal and the time-frequency-transformed second acoustic signal and a second cross time-frequency spectrum of the time-frequency-transformed first acoustic signal and the time-frequency-transformed third acoustic signal; a third operation in which a first Doppler distribution calculation unit obtains a first cross Doppler distribution regarding the first cross time-frequency spectrum and a second cross Doppler distribution regarding the second cross time-frequency spectrum; a fourth operation in which a second Doppler distribution calculation unit obtains a Doppler distribution of a leak sound by subtracting the second cross Doppler distribution from the first cross Doppler distribution; and a fifth operation in which an instantaneous cross correlation function calculation unit performs a 2-dimensional (2D) inverse fast Fourier transform (IFFT) on the Doppler distribution of the leak sound to obtain an instantaneous cross correlation function and detects the leak sound from the instantaneous cross correlation function.

BRIEF DESCRIPTION OF DRAWINGS

The patent or application file contains at least one drawing executed in color. Copies of this patent or patent application publication with color drawing(s) will be provided by the Office upon request and payment of the necessary fee.

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
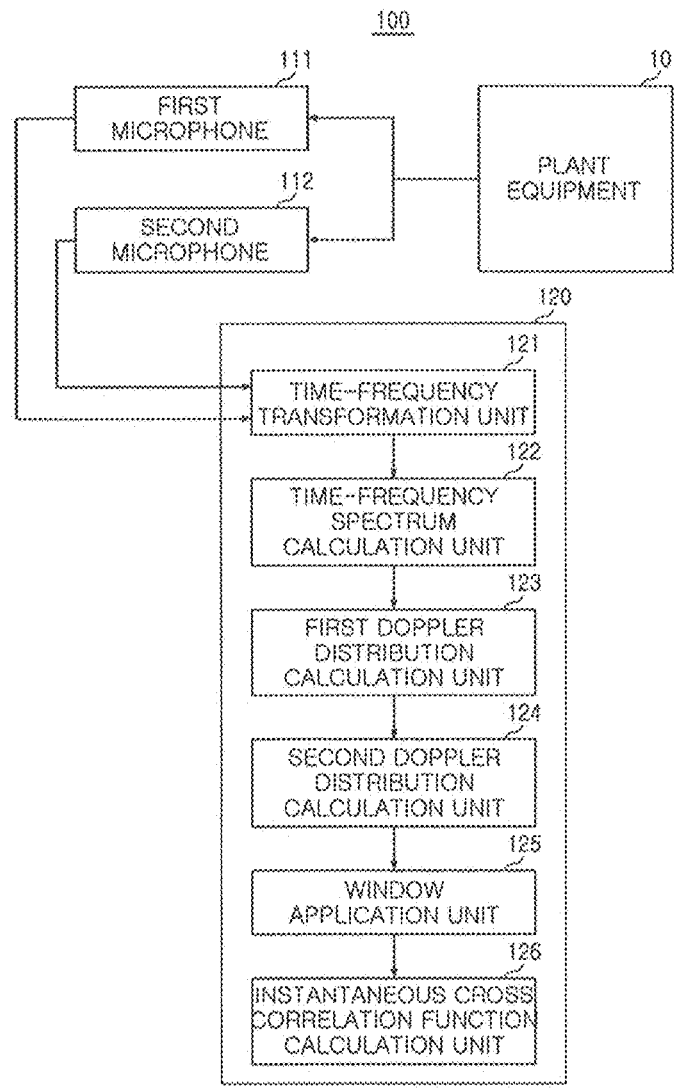
FIG. 1 is an overall block diagram of an apparatus for detecting a leak sound in plant equipment using time-frequency transformation according to an exemplary embodiment of the present disclosure.
Figure 2:
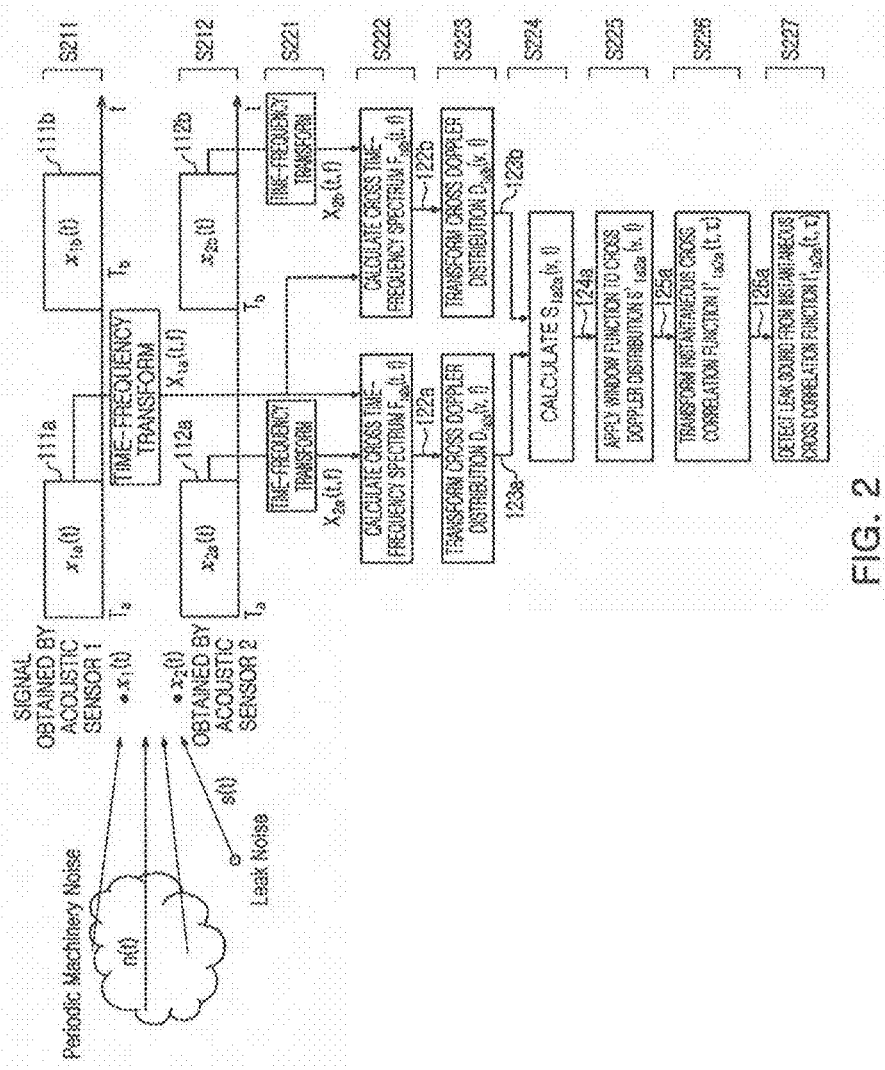
FIG. 2 is a flowchart of a method of detecting a leak sound in plant equipment using time-frequency transformation according to an exemplary embodiment of the present invention.

FIG. 1 is an overall block diagram of an apparatus 100 for detecting a leak sound in plant equipment using time-frequency transformation according to an exemplary embodiment of the present disclosure. Meanwhile, FIG. 2 is a flowchart of a method of detecting a leak sound in plant equipment 10 using time-frequency transformation according to an exemplary embodiment of the present invention.

As illustrated in FIG. 1, the apparatus 100 for detecting a leak sound in plant equipment using time-frequency transformation according to an exemplary embodiment of the present invention may include a first microphone 111 and a second microphone 112 measuring an acoustic signal generated in the plant equipment 10 and a leak sound detection module 120 detecting a leak sound in the plant equipment 10 using time-frequency transformation of the acoustic signal measured by the first microphone 111 and the second microphone 112.

As descried hereinafter, the leak sound detection module 120 may include a time-frequency transformation unit 121, a time-frequency spectrum calculation unit 122, a first Doppler distribution calculation unit 123, a second Doppler distribution calculation unit 124, a window application unit 125, and an instantaneous cross correlation function calculation unit 126.

Hereinafter, an apparatus 100 for detecting a leak sound in plant equipment using time-frequency transformation and a leak sound detecting method using the same according to an exemplary embodiment of the present invention will be described in detail with reference to FIGS. 1 and 2.

The plant equipment 10 is plant equipment including piping, and the like, such as a nuclear power plant or a chemical plant. The plant equipment 10 may be provided inside a plant and may include the first microphone 111 and the second microphone 112 disposed to be spaced apart from each other by a predetermined interval inside the plant.

An acoustic signal generated in the plant equipment 10 is measured through the microphones 111 and 112 in operations S211 and S212, and the measured acoustic signal may be transmitted to the leak sound detection module 120 (acoustic sensor in FIG. 2 refers to the microphone of FIG. 1).

Specifically, when a leakage occurs in the plant equipment 10 in a machinery noise environment, the acoustic signals respectively measured by the microphones 111 and 112 may be expressed as the sum of a leak sound and periodical machinery noise as expressed by Equation 1 below.

$$x(t)=s(t)+n(t) \qquad \text{[Equation 1]}$$

Here, x(t) denotes the acoustic signal measured by each of the microphones 111 and 112, s(t) denotes a leak sound generated in a leaking part of the plant equipment 10, and n(t) denotes periodic machinery noise generated due to a machine operation of the plant equipment 10.

For example, when a signal measured by the first microphone 111 (acoustic sensor 1 of FIG. 2) at a point in time $t=T_a$ is $x_{1a}(t)$ (111a), a signal measured by the second microphone 112 (acoustic sensor 2 of FIG. 2) at a point in time $t=T_a$ is $x_{2a}(t)$ (112a), a signal measured by the first microphone 111 at a point in time $t=T_b$ is $x_{1b}(t)$ (111b), and a signal measured by the second microphone 112 at a point in time $t=T_b$ is $x_{2b}(t)$ (112b), then $x_{1a}(t)$ (111a), $x_{2a}(t)$ (112a), $x_{1b}(t)$ (111b), $x_{2b}(t)$ (112b) may be expressed by the sum of a leak sound component and a machinery noise component as expressed by Equation 2 below.

$$x_{1a}(t)=s_{1a}(t)+n_{1a}(t)$$

$$x_{2a}(t)=s_{2a}(t)+n_{2a}(t)$$

$$x_{1b}(t)=s_{1b}(t)+n_{1b}(t)$$

$$x_{2b}(t)=s_{2b}(t)+n_{2b}(t) \qquad \text{[Equation 2]}$$

The leak sound has a characteristic of a random signal, and the leak sound $s_{1a}(t)$ measured by the first microphone 111 and the leak sound $s_{2a}(t)$ measured by the second microphone 112, which are measured "at the same time $(t=T_a)$," are correlated. Meanwhile, a leak sound (e.g., $s_{1a}(t)$) measured by one microphone (e.g., first microphone 111) and a leak sound (e.g., $s_{2b}(t)$) measured by the other microphone (e.g., second microphone 112) after the lapse of a predetermined amount of time (e.g., $t=T_b$) have the characteristic of a random signal without correlation.

Meanwhile, since machinery noise is expressed as a periodic signal, it may be assumed that machinery noise (e.g., $n_{1a}(t)$) measured by one microphone (e.g., first microphone 111) at $t=T_a$ and machinery noise (e.g., $n_{2b}(t)$) measured by the other microphone (e.g., second microphone 112) after the lapse of a predetermined amount of time (e.g., $t=T_b$) are correlated. Also, it may be assumed that machinery noise (e.g., $n_{1a}(t)$) measured by one microphone (e.g., first microphone 111) at $t=T_a$ and machinery noise (e.g., $n_{2a}(t)$) measured by the other microphone (e.g., second microphone 112) at $t=T_a$ are correlated.

The acoustic signals measured by the first microphone 111 and the second microphone 112 may be transmitted to the leak sound detection module 120.

As illustrated in FIG. 1, the leak sound detection module 120 may include the time-frequency transformation unit 121, the time-frequency spectrum calculation unit 122, the first Doppler distribution calculation unit 123, the second Doppler distribution calculation unit 124, the window application unit 125, and the instantaneous cross correlation function calculation unit 126.

The time-frequency transformation unit 121 of the leak sound detection module 120 may perform time-frequency transformation on the acoustic signals respectively measured at two different points in time through the microphones 111 and 112. Next, the time-frequency spectrum calculation unit 122 of the leak sound detection module 120 may calculate a cross time-frequency spectrum between the time-frequency-transformed acoustic signals as acoustic signals respectively measured at the same time through the microphones 111 and 112 and a cross time-frequency spectrum between the time-frequency-transformed acoustic signals as acoustic signals respectively measured at different points in time through the microphones. Next, the first Doppler distribution calculation unit 123 of the leak sound detection module 120 may perform FFT on time t to obtain a cross Doppler distribution of the two cross time-frequency spectrums. Next, the second Doppler distribution calculation unit 124 of the leak sound detection module 120 may subtract the two cross Doppler distributions to obtain a Doppler distribution of the leak sound. Next, the instantaneous cross correlation function calculation unit 126 of the leak sound detection module 120 may perform 2 dimensional inverse FFT (2D IFFT) on the Doppler distribution of the leak sound to obtain an instantaneous cross correlation function and detect a leak sound therefrom. In addition, the leak sound detection module 120 may further include the window application unit 125 for removing a region excluding the leak sound expressed as a vertical line shape by applying a window function to the Doppler distribution of the leak sound.

Hereinafter, a process of detecting a leak sound by utilizing a first acoustic signal 11a measured at a first point in time $T_a$ through the first microphone 111 and a second acoustic signal 112a measured at the first point in time $T_a$ through the second microphone 112, as two acoustic signals measured at the same point in time and by utilizing the first acoustic signal 11a measured at the first point in time $T_a$ through the first microphone 111 and a third acoustic signal 112b measured at a second point in time $T_b$ after the lapse of a predetermined amount of time from the first point in time $T_a$ through the second microphone 112, as two acoustic signals measured at different points in time will be described.

The time-frequency transformation unit 121 of the leak sound detection module 120 may time-frequency-transform each of the first acoustic signal 11a measured at the first point in time $T_a$ through the first microphone 111, the second acoustic signal 112a measured at the first point in time $T_a$ through the second microphone 112, and the third acoustic signal 112b measured at the second point in time $T_b$ after the lapse of a predetermined amount of time from the first point in time $T_a$ through the second microphone 112 in operation S221. The respective time-frequency transformation results may be expressed as $X_{1a}(t, f)$, $X_{2a}(t, f)$, $X_{2b}(t, f)$. Here, t denotes time and f denotes frequency.

Here, short-time Fourier transform (STSF), wavelet transform, and Wignerville distribution, and the like, may be used as the time-frequency transformation method.

Next, the time-frequency spectrum calculation unit 122 of the leak sound detection module 120 may calculate a first cross time-frequency spectrum $F_{1a2a}(t, f)$ of the time-frequency-transformed first acoustic signal $X_{1a}(t, f)$ and the time-frequency-transformed second acoustic signal $F_{1a2a}(t, f)$ and a second cross time-frequency spectrum $F_{1a2b}(t, f)$ of the time-frequency-transformed first acoustic signal $X_{1a}(t, f)$ and the time-frequency-transformed third acoustic signal $X_{2b}(t, f)$ according to Equation 3 below in operation S222. Here, the superscript * represents a complex conjugate.

$$F_{1a2a}(t,f) = X_{1a}(t,f)^* \cdot X_{2a}(t,f)$$

$$F_{1a2b}(t,f) = X_{1a}(t,f)^* \cdot X_{2b}(t,f) \quad \text{[Equation 3]}$$

Next, the first Doppler distribution calculation unit 123 of the leak sound detection module 120 may perform FFT on time t according to Equation 4 below to obtain a first cross Doppler distribution $D_{1a2a}(v, f)$ regarding the first cross time-frequency spectrum and a second cross Doppler distribution $D_{1a2b}(v, f)$ regarding the second cross time-frequency spectrum in operation S223.

$$D_{1a2a}(v,f) = FFT_t\{F_{1a2a}(t,f)\}$$

$$D_{1a2b}(v,f) = FFT_t\{F_{1a2b}(t,f)\} \quad \text{[Equation 4]}$$

Here, v denotes a frequency shift.

Since the signals of the first microphone 111 and the second microphone 112 measured at the same time $t=T_a$ are included, $D_{1a2a}(v, f)$ includes both a leak sound component and a periodic machinery noise component, and in particular, the leak sound component appears as a vertical line in the vicinity of $D_{1a2a}(0, f)$ and the periodical machinery noise component mainly appears in dot form (please see 123a of FIGS. 5 and 6, to be described hereinafter).

Meanwhile, since there is no correlation between leak sounds obtained in different time zones, the leak sound component does not appear in $D_{1a2b}(v, f)$. Meanwhile, since the periodical mechanical noise components are correlated with each other although they are obtained in different time zones, the periodic mechanical noise components appear in the form of dots in $D_{1a2b}(v, f)$ (please see 123b of FIGS. 5 and 6).

Since the leak sound component and the periodical machinery noise component appear in $D_{1a2a}(v, f)$ and only the periodical machinery noise component appears in $D_{1a2b}(v, f)$, when the leak sound component in the cross Doppler distribution is defined as $S_{1a2a}(v, f)$, magnitude and phase of $S_{1a2a}(v, f)$ may be assumed as expressed by Equation 5 below.

When it is also assumed that phase information of $S_{1a2a}(v, f)$ is not significantly affected by the machinery noise and is mainly influenced by phase information of the leak sound component ($\angle S_{1a2a}(v, f) \approx \angle D_{1a2a}(v, f)$), the phase of $S_{1a2a}(v, f)$ may be replaced with the phase information of $D_{1a2a}(v, f)$.

$$|S_{1a2a}(v,f)| = |D_{1a2a}(v,f)| - |D_{1a2b}(v,f)|$$

$$\angle S_{1a2a}(v,f) \approx \angle D_{1a2a}(v,f) \quad \text{[Equation 5]}$$

The second Doppler distribution calculation unit 124 of the leak sound detection module 120 may subtract the second cross Doppler distribution from the first cross Doppler distribution to obtain the Doppler distribution $S_{1a2a}(v, f)$ of the leak sound in operation S224.

The window application unit 125 of the leak sound detection module 120 may apply a window function to the Doppler distribution of the leak sound to remove a region excluding the leak sound in operation S225.

Specifically, since the leak sound component is mainly distributed in the vicinity of $D_{1a2a}(0, f)$, a method of removing the other part by applying the window function W (v, f), and when the leak sound component to which the window function is applied in the cross Doppler domain is defined as $S'_{1a2a}(v, f)$, it may be expressed by Equation 6 below.

$$S'_{1a2a}(v,f) = S_{1a2a}(v,f) \cdot W(v,f) \qquad \text{[Equation 6]}$$

The instantaneous cross correlation function calculation unit 126 of the leak sound detection module 120 may perform 2D IFFT on the Doppler distribution $S'_{1a2a}(v, f)$ of the leak sound from which the region excluding the leak sound was removed, to obtain an instantaneous cross correlation function $I'_{1a2a}(t, \tau)$ in operation S226.

Specifically, the instantaneous cross correlation function $I'_{1a2a}(t, \tau)$ as expressed in Equation 7 may be obtained through 2D IFFT on v and f with respect to $S'_{1a2a}(v, f)$. In the instantaneous cross correlation function $I'_{1a2a}(t, \tau)$, there exists only the leak sound component from which the periodical machinery noise component has been removed. Here, tau ($\tau$) represents a time delay.

$$I'_{1a2a}(t,\tau) = \text{IFFT}_{v,f}\{S'_{1a2a}(v,f)\} \qquad \text{[Equation 7]}$$

Finally, the instantaneous cross correlation function calculation unit 126 of the leak sound detection module 120 may detect a leak sound from the instantaneous cross correlation function obtained according to Equation 7 in operation S227.

That is, once the leak sound occurs, it continuously occurs and a position (direction) thereof does not change, and thus, when the instantaneous cross correlation function described above has a horizontal line (linear form), it may be determined that there exists a leak sound. Further, it is also possible to detect a leakage position (direction) from the time delay (t) information of the instantaneous cross correlation function, and since this is obvious to those skilled in the art, a detailed description thereof will be omitted for the purpose of simplicity.

Figure 3:
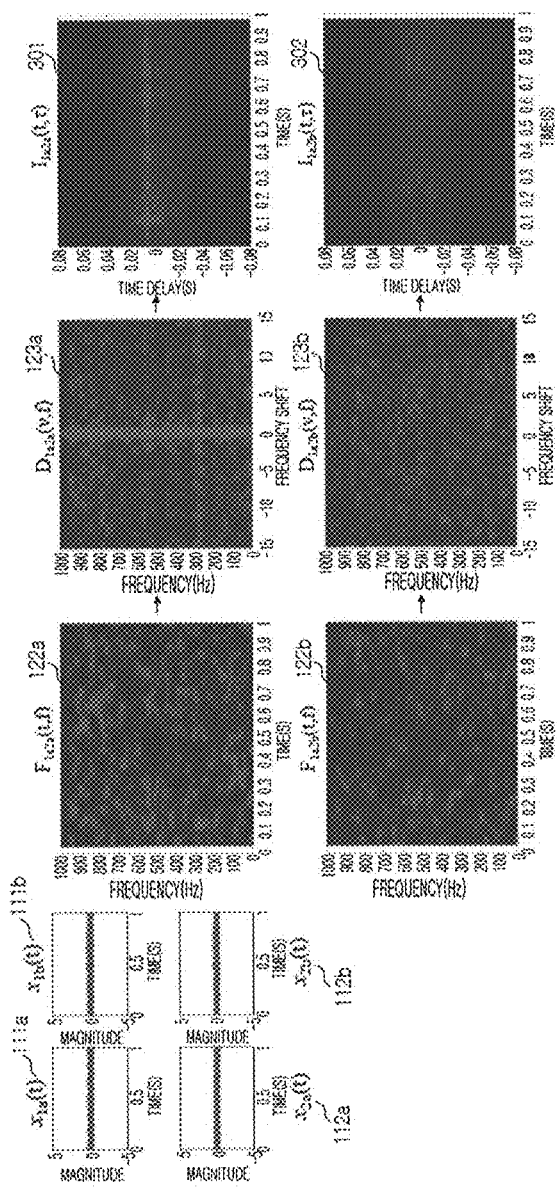
FIG. 3 illustrates simulation waveforms of a cross time-frequency spectrum, a cross Doppler distribution and instantaneous cross correlation function in a case in which only a leak sound exists.

FIG. 3 illustrates simulation waveforms of a cross time-frequency spectrum, a cross Doppler distribution and instantaneous cross-correlation function in a case in which only a leak sound exists.

In FIG. 3, reference numeral 111*a* denotes an acoustic signal $x_{1a}(t)$, reference numeral 111*b* denotes an acoustic signal $x_{1b}(t)$, reference numeral 112*a* denotes an acoustic signal $x_{2a}(t)$, reference numeral 112*b* denotes an acoustic signal $x_{2b}(t)$, reference numeral 122*a* denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123*a* denotes a cross Doppler distribution $D_{1a2a}(v, f)$ regarding $F_{1a2a}(t, f)$, reference numeral 301 denotes an instantaneous cross correlation function $I_{1a2a}(t, \tau)$ of $D_{1a2a}(v, f)$, reference numeral 122*b* denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123*b* denotes a cross Doppler distribution $D_{1a2b}(v, f)$ regarding $F_{1a2b}(t, f)$, and reference numeral 302 denotes an instantaneous cross correlation function $I_{1a2b}(t, \tau)$ of $D_{1a2b}(v, f)$.

As illustrated in FIG. 3, it can be seen that, since there is a correlation between the leak sounds measured in the same time zone, the leak sound component appears in $D_{1a2a}(v, f)$ (123*a*), but since there is no correlation between the leak sounds obtained in different time zones, no leak sound component appears in $D_{1a2b}(v, f)$ (123*b*). Also, it can be seen that, in the instantaneous cross correlation function 301, the leak sound component appears as a continuous horizontal line (straight line) with a constant time delay $\tau$.

Figure 4:
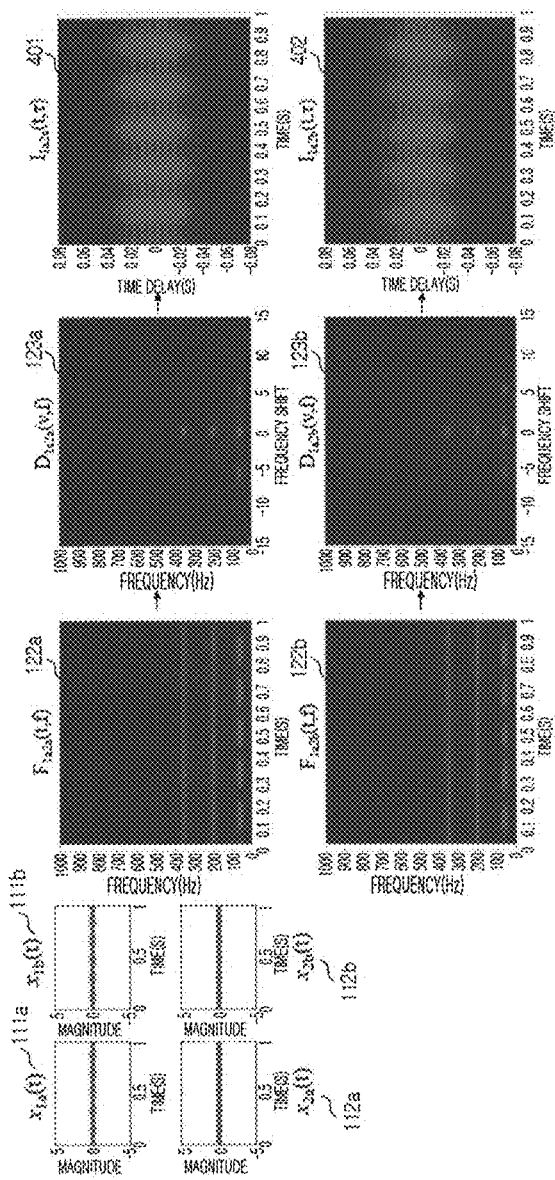
FIG. 4 illustrates simulation waveforms of a cross time-frequency spectrum, cross Doppler distribution and an instantaneous cross correlation function in a case in which only periodic machinery noise exists.

FIG. 4 illustrates simulation waveforms of a cross time-frequency spectrum, cross Doppler distribution and an instantaneous cross correlation function in a case in which only periodic machinery noise exists.

Similar to FIG. 3, in FIG. 4, reference numeral 111*a* denotes an acoustic signal $x_{1a}(t)$, reference numeral 111*b* denotes an acoustic signal $x_{1b}(t)$, reference numeral 112*a* denotes an acoustic signal $x_{2a}(t)$, reference numeral 112*b* denotes an acoustic signal $x_{2b}(t)$, reference numeral 122*a* denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123*a* denotes a cross Doppler distribution $D_{1a2a}(v, f)$ regarding $F_{1a2a}(t, f)$, reference numeral 401 denotes an instantaneous cross correlation function $I_{1a2a}(t, \tau)$ of $D_{1a2a}(v, f)$, reference numeral 122*b* denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123*b* denotes a cross Doppler distribution $D_{1a2b}(v, f)$ regarding $F_{1a2b}(t, f)$, and reference numeral 402 denotes an instantaneous cross correlation function $I_{1a2b}(t, \tau)$ of $D_{1a2b}(v, f)$.

As illustrated in FIG. 4, it can be seen that, in a case in which there is only a periodic signal, the periodic signals exhibit similar cross Doppler distribution forms 123*a* and 123*b* although the measurement time zones are different.

Figure 5:
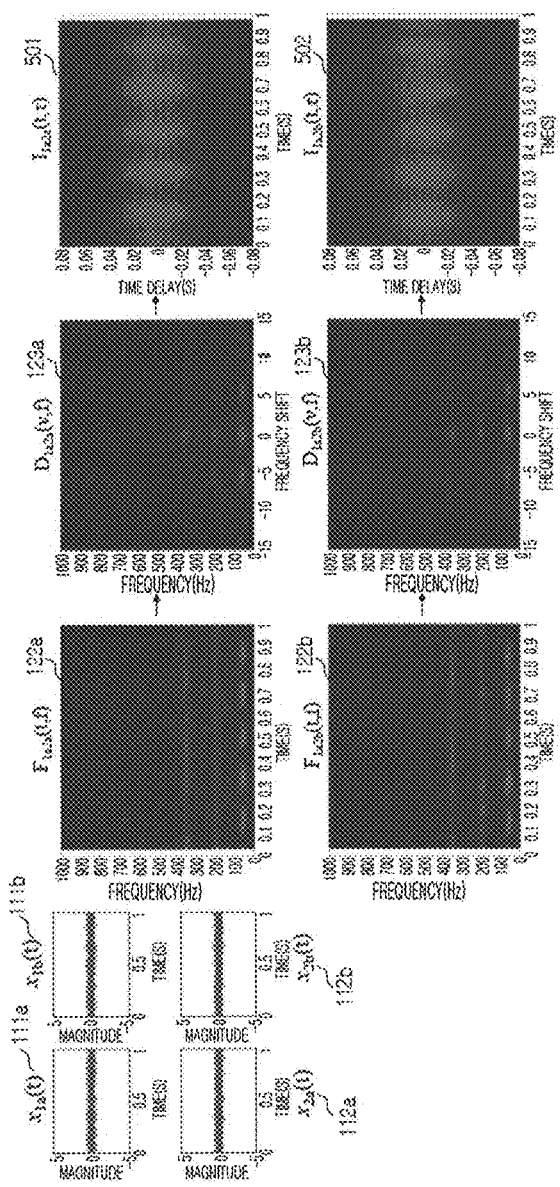
FIG. 5 illustrates simulation waveforms of a cross time-frequency spectrum, a cross Doppler distribution, and an instantaneous cross correlation function before application of the present invention when a leak sound and periodic machinery noise are simultaneously present.

FIG. 5 illustrates simulation waveforms of a cross time-frequency spectrum, a cross Doppler distribution, and an instantaneous cross correlation function before application of the present invention when a leak sound and periodic machinery noise are simultaneously present.

In FIG. 5, reference numeral 111*a* denotes an acoustic signal $x_{1a}(t)$, reference numeral 111*b* denotes an acoustic signal $x_{1b}(t)$, reference numeral 112*a* denotes an acoustic signal $x_{2a}(t)$, reference numeral 112*b* denotes an acoustic signal $x_{2b}(t)$, reference numeral 122*a* denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123*a* denotes a cross Doppler distribution $D_{1a2a}(v, f)$ regarding $F_{1a2a}(t, f)$, reference numeral 501 denotes an instantaneous cross correlation function $I_{1a2a}(t, \tau)$ of $D_{1a2a}(v, f)$, reference numeral 122*b* denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123*b* denotes a cross Doppler distribution $D_{1a2b}(v, f)$ regarding $F_{1a2b}(t, f)$, and reference numeral 502 denotes an instantaneous cross correlation function $I_{1a2b}(t, \tau)$ of $D_{1a2b}(v, f)$.

As illustrated in FIG. 5, it can be seen that, when the leak sound and the periodic signal coexist, the instantaneous cross correlation functions 501 before the application of the present invention have the leak sound component and periodic machinery noise together, it is difficult to easily find a leak sound component.

Figure 6:
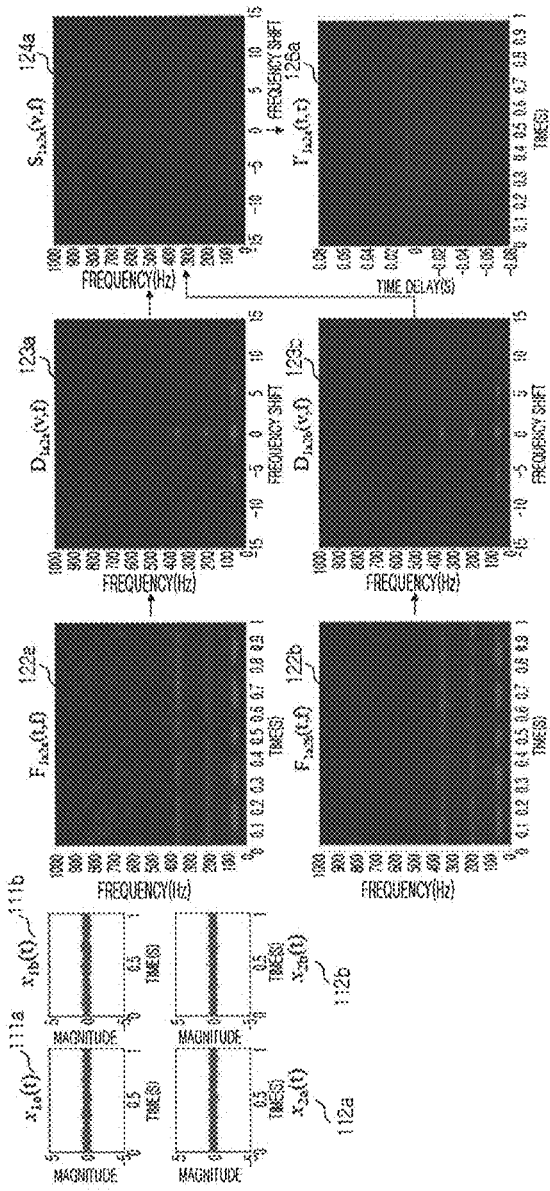
FIG. 6 illustrates simulation waveforms of a cross time-frequency spectrum, a cross Doppler distribution and an instantaneous cross correlation function after application of the present invention when a leak sound and periodic machinery noise are simultaneously present.

FIG. 6 illustrates simulation waveforms of a cross time-frequency spectrum, a cross Doppler distribution and an instantaneous cross correlation function after application of the present invention when a leak sound and periodic machinery noise are simultaneously present.

In FIG. 6, reference numeral 111a denotes an acoustic signal $x_{1a}(t)$, reference numeral 111b denotes an acoustic signal $x_{1b}(t)$, reference numeral 112a denotes an acoustic signal $x_{2a}(t)$, reference numeral 112b denotes an acoustic signal $x_{2b}(t)$, reference numeral 122a denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123a denotes a cross Doppler distribution $D_{1a2a}(v, f)$ regarding $F_{1a2a}(t, f)$, reference numeral 122b denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123b denotes a cross Doppler distribution $D_{1a2b}(v, f)$ regarding $F_{1a2b}(t, f)$, reference numeral 124a denotes a Doppler distribution $S_{1a2a}(v, f)$ of the leak sound obtained by subtracting the cross Doppler distribution $D_{1a2b}(v, f)$ from the cross Doppler distribution $D_{1a2a}(v, f)$, and reference numeral 126a denotes an instantaneous cross correlation function $I'_{1a2a}(t, \tau)$ obtained by performing 2D IFFT on the Doppler distribution $S_{1a2a}(v, f)$ of the leak sound.

As illustrated in FIG. 6, the leak sound component (horizontal line with constant $\tau$) may be easily checked (See 126a) in the instantaneous cross correlation function $I'_{1a2a}(t, \tau)$ by applying the signal processing algorithm proposed in the present disclosure, unlike the case of FIG. 5.

Figure 7:
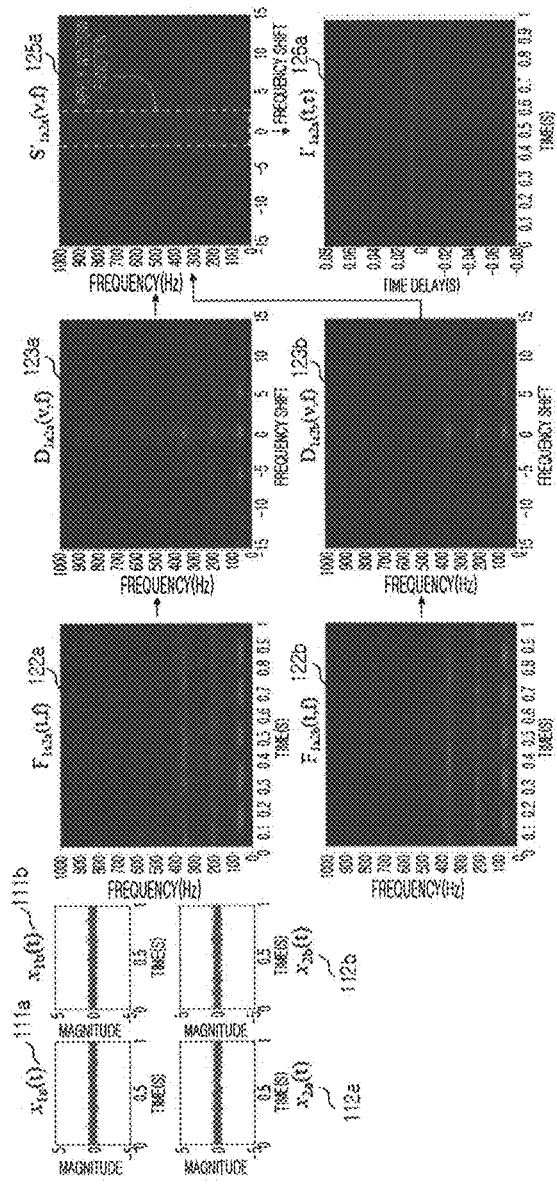
FIG. 7 illustrates simulation waveforms of a cross time-frequency spectrum, cross Doppler distribution, and an instantaneous cross correlation function according to the present invention when a window function is additionally applied to FIG. 6.

FIG. 7 illustrates simulation waveforms of a cross time-frequency spectrum, cross Doppler distribution, and an instantaneous cross correlation function according to the present invention when a window function is additionally applied to FIG. 6.

In FIG. 7, reference numeral 111a denotes an acoustic signal $x_{1a}(t)$, reference numeral 111b denotes an acoustic signal $x_{1b}(t)$, reference numeral 112a denotes an acoustic signal $x_{2a}(t)$, reference numeral 112b denotes an acoustic signal $x_{2b}(t)$, reference numeral 122a denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123a denotes a cross Doppler distribution $D_{1a2a}(v, f)$ regarding $F_{1a2a}(t, f)$, reference numeral 122b denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123b denotes a cross Doppler distribution $D_{1a2b}(v, f)$ regarding $F_{1a2b}(t, f)$, and reference numeral 125a denotes a result $S'_{1a2a}(v, f)$ obtained by applying the window function to the Doppler distribution of the leak sound, and reference numeral 126a denotes an instantaneous cross correlation function $I'_{1a2a}(t, \tau)$ of the Doppler distribution $S'_{1a2a}(v, f)$ of the leak sound to which the window is applied.

As illustrated in FIG. 7, the leak sound component may be more clearly observed in the instantaneous cross correlation function as compared with FIG. 6 (See 126a).

Figure 8:
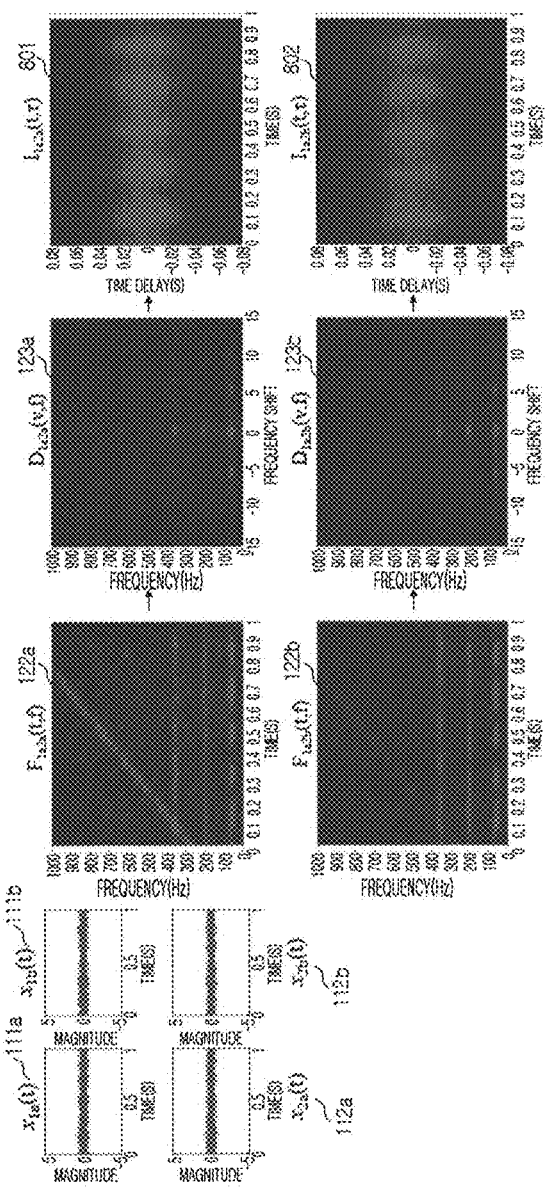
FIG. 8 illustrates simulation waveforms of a cross time-frequency spectrum, cross Doppler distribution, and an instantaneous cross correlation function before application of the present invention when there is a transient dispersive signal in addition to a leak sound and periodic machinery noise.

FIG. 8 illustrates simulation waveforms of a cross time-frequency spectrum, cross Doppler distribution, and an instantaneous cross correlation function before application of the present invention when there is a transient dispersive signal in addition to a leak sound and periodic machinery noise.

In FIG. 8, reference numeral 111a denotes an acoustic signal $x_{1a}(t)$, reference numeral 111b denotes an acoustic signal $x_{1b}(t)$, reference numeral 112a denotes an acoustic signal $x_{2a}(t)$, reference numeral 112b denotes an acoustic signal $x_{2b}(t)$, reference numeral 122a denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123a denotes a cross Doppler distribution $D_{1a2a}(v, f)$ regarding $F_{1a2a}(t, f)$, reference numeral 801 denotes an instantaneous cross correlation function $I_{1a2a}(t, \tau)$ of $D_{1a2a}(v, f)$, reference numeral 122b denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123b denotes a cross Doppler distribution $D_{1a2b}(v, f)$ regarding $F_{1a2b}(t, f)$, and reference numeral 802 denotes an instantaneous cross correlation function $I_{1a2b}(t, \tau)$ of $D_{1a2b}(v, f)$.

As illustrated in FIG. 8, it can be seen that it is difficult to determine a leak sound component when a transient dispersive signal is additionally generated (See 801 and 802).

Figure 9:
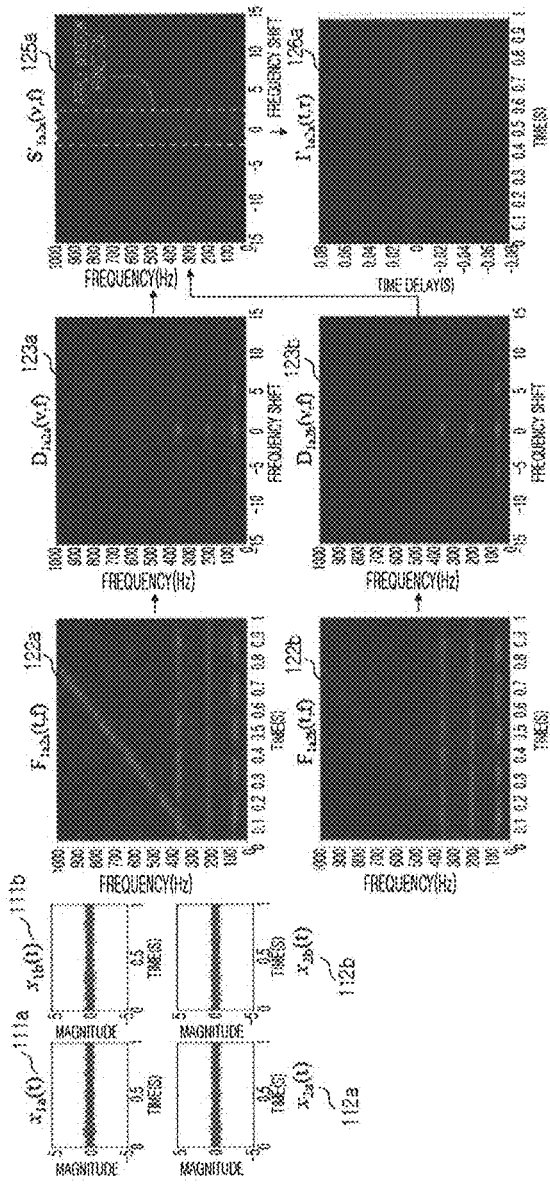
FIG. 9 illustrates simulation waveforms of a cross time-frequency spectrum, cross Doppler distribution and an instantaneous cross correlation function when a method of the present invention is applied to FIG. 8.

FIG. 9 illustrates simulation waveforms of a cross time-frequency spectrum, cross Doppler distribution and an instantaneous cross correlation function when a method of the present invention is applied to FIG. 8.

In FIG. 9, reference numeral 111a denotes an acoustic signal $x_{1a}(t)$, reference numeral 111b denotes an acoustic signal $x_{1b}(t)$, reference numeral 112a denotes an acoustic signal $x_{2a}(t)$, reference numeral 112b denotes an acoustic signal $x_{2b}(t)$, reference numeral 122a denotes a cross time-frequency spectrum $F_{1a2a}(t, f)$ of the time-frequency-transformed acoustic signal $X_{1a}(t, f)$ and the time-frequency-transformed acoustic signal $X_{2a}(t, f)$, reference numeral 123a denotes a cross Doppler distribution $D_{1a2a}(v, f)$ regarding $F_{1a2a}(t, f)$, reference numeral 122b denotes a cross time-frequency spectrum $F_{1a2b}(t, f)$ of the time-frequency-transformed acoustic signal $X_{1a}(t, f)$ and the time-frequency-transformed acoustic signal $X_{2b}(t, f)$, reference numeral 123b denotes a cross Doppler distribution $D_{1a2b}(v, f)$ regarding $F_{1a2b}(t, f)$, and reference numeral 125a denotes a result $S'_{1a2a}(v, f)$ obtained by applying the window function to the Doppler distribution of the leak sound, and reference numeral 126a denotes an instantaneous cross correlation function $I'_{1a2a}(t, \tau)$ of the Doppler distribution $S'_{1a2a}(v, f)$ of the leak sound to which the window is applied.

As illustrated in FIG. 9, it can be seen that, since a transient signal is not continuously generated in the instantaneous cross correlation function, the leak sound component may be detected even when a transient dispersive signal is included, using the proposed method (See 126a).

As set forth above, according to exemplary embodiments of the present disclosure, by using the time-frequency transformation for the acoustic signal measured through the microphone, the leak sound may be detected even when the transient dispersive signal, as well as the periodic noise signal, is large, as compared with the case of using only frequency transformation.

While exemplary embodiments have been shown and described above, it will be apparent to those skilled in the art that modifications and variations could be made without departing from the scope of the present invention as defined by the appended claims.

What is claimed is:

1. An apparatus for detecting a leak sound in plant equipment using time-frequency transformation, the apparatus comprising:
   a first microphone measuring an acoustic signal generated in the plant equipment;
   a second microphone measuring an acoustic signal generated in the plant equipment; and a leak sound detection module detecting the leak sound in the plant equipment from the acoustic signal measured by the first microphone and the acoustic signal measured by the second microphone, wherein the acoustic signals measured by the first and second microphones detect the leak sound in the plant equipment and periodic machinery noise of the plant equipment, wherein the leak sound detection module detects the leak sound using time-frequency transformation of the acoustic signal measured by the first microphone and the acoustic signal measured by the second microphone, and wherein the leak sound detection module performs time-frequency transformation on acoustic signals measured at different points in time through the respective microphones, obtains a cross time-frequency spectrum between acoustic signals which have been measured at the same point in time and time-frequency-transformed through the respective microphones, obtains a cross time-frequency spectrum between acoustic signals which have been measured at different points in time and time-frequency-transformed through the respective microphones, and subsequently signal-processes the two cross time-frequency spectrums to detect the leak sound while eliminating an effect of the periodic machinery noise.

2. The apparatus of claim 1, wherein the leak sound detection module separately obtains cross Doppler distributions of the two cross time-frequency spectrums, subtracts the cross Doppler distributions to obtain a Doppler distribution of the leak sound, performs a 2-dimensional (2D) inverse fast Fourier transform (IFFT) on the obtained Doppler distribution of the leak sound to obtain an instantaneous cross correlation function, and detects the leak sound from the instantaneous cross correlation function.

3. The apparatus of claim 2, wherein the leak sound detection module includes:

a time-frequency transformation unit performing time-frequency transformation on a first acoustic signal measured at a first point in time through the first microphone, a second acoustic signal measured at the first point in time through the second microphone, and a third acoustic signal measured at a second point in time after the lapse of a predetermined amount of time from the first point in time through the second microphone;

a time-frequency spectrum calculation unit calculating a first cross time-frequency spectrum of the time-frequency-transformed first acoustic signal and the time-frequency-transformed second acoustic signal and a second cross time-frequency spectrum of the time-frequency-transformed first acoustic signal and the time-frequency-transformed third acoustic signal;

a first Doppler distribution calculation unit obtaining a first cross Doppler distribution regarding the first cross time-frequency spectrum and a second cross Doppler distribution regarding the second cross time-frequency spectrum;

a second Doppler distribution calculation unit obtaining a Doppler distribution of a leak sound by subtracting the second cross Doppler distribution from the first cross Doppler distribution; and an instantaneous cross correlation function calculation unit performing 2-dimensional (2D) inverse fast Fourier transform (IFFT) on the Doppler distribution of the leak sound to obtain an instantaneous cross correlation function and detecting the leak sound from the instantaneous cross correlation function.

4. The apparatus of claim 3, further comprising:

a window application unit applying a window function to the Doppler distribution of the leak sound to remove a region excluding the leak sound appearing in the form of a vertical line.

5. The apparatus of claim 3, wherein the time-frequency transformation unit uses any one of short-time Fourier transform (STSF), wavelet transform, and Wignerville distribution.

6. The apparatus of claim 3, wherein the leak sound is displayed in the form of a horizontal line in the instantaneous cross correlation function.

7. A method of detecting a leak sound using a leak sound detecting apparatus having a first microphone and a second microphone measuring an acoustic signal generated in plant equipment, the method comprising:

a first operation in which a time-frequency transformation unit performs time-frequency transformation on a first acoustic signal measured at a first point in time through the first microphone, a second acoustic signal measured at the first point in time through the second microphone, and a third acoustic signal measured at a second point in time after the lapse of a predetermined amount of time from the first point in time through the second microphone;

a second operation in which a time-frequency spectrum calculation unit calculates a first cross time-frequency spectrum of the time-frequency-transformed first acoustic signal and the time-frequency-transformed second acoustic signal and a second cross time-frequency spectrum of the time-frequency-transformed first acoustic signal and the time-frequency-transformed third acoustic signal;

a third operation in which a first Doppler distribution calculation unit obtains a first cross Doppler distribution regarding the first cross time-frequency spectrum and a second cross Doppler distribution regarding the second cross time-frequency spectrum;

a fourth operation in which a second Doppler distribution calculation unit obtains a Doppler distribution of a leak sound by subtracting the second cross Doppler distribution from the first cross Doppler distribution; and a fifth operation in which an instantaneous cross correlation function calculation unit performs a 2-dimensional (2D) inverse fast Fourier transform (IFFT) on the Doppler distribution of the leak sound to obtain an instantaneous cross correlation function and detects the leak sound from the instantaneous cross correlation function.

* * * * *